United States Patent
Sriramulu et al.

(10) Patent No.: US 12,271,419 B2
(45) Date of Patent: Apr. 8, 2025

(54) GENERATING SYNCHRONIZED TIMESTAMPS ACROSS VARIOUS CAPTURE DEVICES FOR VISUAL MEDIA MANAGEMENT

(71) Applicant: Adobe Inc., San Jose, CA (US)

(72) Inventors: Ulaganathan Sriramulu, San Jose, CA (US); Donald Peregrine Clarke, Gilroy, CA (US); Alexander Dixon, Minneapolis, MN (US); Abhishek Kumar Singh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 97 days.

(21) Appl. No.: 18/303,915

(22) Filed: Apr. 20, 2023

(65) Prior Publication Data
US 2024/0354340 A1    Oct. 24, 2024

(51) Int. Cl.
| | |
|---|---|
| *G06F 16/75* | (2019.01) |
| *G06F 16/55* | (2019.01) |
| *G06F 16/583* | (2019.01) |
| *G06F 16/587* | (2019.01) |
| *G06F 16/783* | (2019.01) |
| *G06F 16/787* | (2019.01) |

(52) U.S. Cl.
CPC ............ *G06F 16/75* (2019.01); *G06F 16/55* (2019.01); *G06F 16/583* (2019.01); *G06F 16/587* (2019.01); *G06F 16/783* (2019.01); *G06F 16/787* (2019.01)

(58) Field of Classification Search
CPC ........ G06F 16/75; G06F 16/55; G06F 16/583; G06F 16/587; G06F 16/783; G06F 16/787
See application file for complete search history.

(56) References Cited

U.S. PATENT DOCUMENTS

| | | | | |
|---|---|---|---|---|
| 2012/0005207 | A1* | 1/2012 | Gulhane | G06F 16/9535 707/E17.014 |
| 2020/0221400 | A1* | 7/2020 | Gorsica | H04W 4/80 |

* cited by examiner

*Primary Examiner* — Cam Y T Truong
(74) *Attorney, Agent, or Firm* — Keller Preece PLLC

(57) ABSTRACT

The present disclosure relates to systems, non-transitory computer-readable media, and methods for synchronizing timestamps associated with media files across a variety of capture devices. For example, the disclosed systems receive a media file captured with a user device and determine, from metadata, initial timestamp information for the media file that includes inaccurate or incomplete time zone information. The disclosed systems determine a predicted time zone for the media file by extracting GPS information from the metadata associated with the media file or identifying a peer media file and utilizing a time zone or GPS information associated with the peer media file. The disclosed systems generate a synchronized timestamp for the media file with updated timestamp information based on the predicted time zone.

20 Claims, 7 Drawing Sheets

GENERATING SYNCHRONIZED TIMESTAMPS ACROSS VARIOUS CAPTURE DEVICES FOR VISUAL MEDIA MANAGEMENT

BACKGROUND

Recent years have seen significant improvements in hardware and software for capturing, organizing, and sharing visual media, such as digital photographs or videos. For example, conventional systems import visual media captured by various devices and organize the imported media according to content and/or context. To illustrate, conventional systems often access timestamps associated with imported media files to organize and view media files on a timeline based on their capture time. Although conventional systems organize media files based on timestamps and other metadata, such systems have a number of problems in relation to accuracy, efficiency, and flexibility of operation. For instance, conventional systems inaccurately determine media timelines due to inaccurate or incomplete timestamp information. Specifically, conventional systems rely on timestamp information that varies across capture devices to manage visual media, often leading to incorrect results. These along with additional problems and issues exist with regard to conventional visual media management systems.

BRIEF SUMMARY

Embodiments of the present disclosure provide benefits and/or solve one or more of the foregoing or other problems in the art with systems, non-transitory computer-readable media, and methods that analyze the accuracy and fidelity of timestamp information included in metadata associated with media files imported from a variety of capture devices, such as various smartphones, digital cameras, drones, scanners, and so forth. To accurately organize and view imported media files on a timeline, for instance, the disclosed systems generate and synchronize high-fidelity capture timestamps across media files captured and imported by multiple capture devices. In one or more implementations, the disclosed systems utilize various methods to intelligently identify and analyze timestamp information within metadata associate with imported media files to accurately and efficiently generate synchronized, full-fidelity timestamps for media files across various capture devices. Accordingly, the disclosed systems adaptively and flexibly identify relevant timestamp information and generate synchronized timestamps across a variety of media files (e.g., media files comprising various metadata formats and content) for improved media management.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
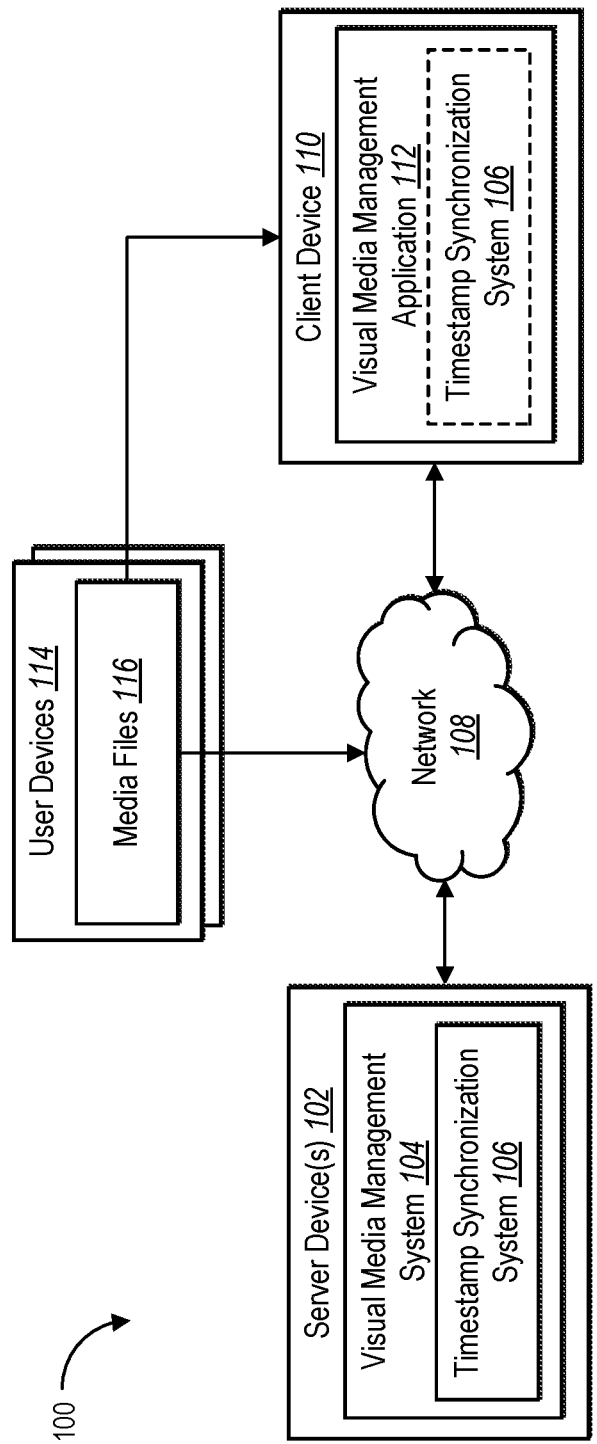
FIG. 1 illustrates a diagram of an environment in which a timestamp synchronization system operates in accordance with one or more embodiments.

This disclosure describes one or more embodiments of a timestamp synchronization system that analyzes timestamp information and generates synchronized timestamps for visual media files captured by a variety of devices. In particular, in one or more embodiments, the timestamp synchronization system utilizes a heuristic model to synthesize full-fidelity capture timestamps from timestamp field entries recorded in media files at different locations in associated metadata and in different time formats. Moreover, in some embodiments, the timestamp synchronization system utilizes contextual information stored in metadata associated with other media files captured and imported by other capture devices. As described in further detail below, in one or more embodiments, the timestamp synchronization system implements a multi-stage metadata augmentation process to determine accurate timestamp information and generate a synchronized timestamp for any given media file.

To further illustrate, in some embodiments, the timestamp synchronization system receives a collection of media files captured by various user devices and, from metadata associated with each media file, determines initial timestamp information for each media file within the collection. In response to determining that the initial timestep information for at least one of the media files is incomplete or otherwise inaccurate, the timestamp synchronization system intelligently determines time zone information for the identified media file(s) based on related information, such as Global Positioning System ("GPS") information associated with the identified media file(s) or information associated with other media files within the collection. In some embodiments, the timestamp synchronization system generates synchronized timestamps for the imported collection of media file by updating timestamp information and/or a format of the initial timestamp information to ensure fidelity across the media files captured by the various user devices.

In some embodiments, the timestamp synchronization system utilizes various models to intelligently identify, determine, extract, and/or generate information for synchronized timestamps across media files captured by various devices. For instance, in one or more embodiments, the timestamp synchronization system utilizes a metadata reader with a timestamp field detection model to identify, determine, and/or extract timestamp field entries from metadata associated with imported media files. In some implementations, for example, the timestamp synchronization system utilizes extracted timestamp field entries from related media files to determine updated timestamp information for synchronized timestamps.

Moreover, in some embodiments, the timestamp synchronization system utilizes a peer media file detection model to identify one or more media files related to an imported media file. For example, in some embodiments, the peer media file detection model identifies a peer media file related to an imported media file and determines that the peer media file was captured on an additional user device associated with the user device that captured the imported media file.

The timestamp synchronization system provides many advantages and benefits over conventional systems and methods. For example, by implementing a heuristic model to intelligently generate synchronized timestamps across media files from a variety of capture devices, the timestamp synchronization system improves accuracy relative to conventional systems. Specifically, the timestamp synchronization system consistently generates accurate, high-fidelity timestamps utilizing various sources of information to ensure synchronization across media files captured by devices that provide varying timestamp formats and content.

In addition to improved accuracy and fidelity across different capture device, the timestamp synchronization system implements improvements in efficiency over conventional systems and methods. For example, by implementing an automated, heuristic model to intelligently assess initial timestamp information, determine missing information or correct inaccurate information, and generate updated timestamp information for multiple media files captured by various devices, the timestamp synchronization system efficiently and, in some implementations, autonomously generates synchronized timestamps for entire collections of media files.

Also, by heuristically synchronizing timestamps across media files from various capture devices, the timestamp synchronization system provides increased flexibility compared to conventional systems and methods. For example, in certain implementations, media files captured by different devices comprise significant differences in timestamp information and/or formatting, which in turn leads to difficulties in identifying information across a plurality of media files and in organizing media files according to timestamp information, such as capture time, capture locations, and so forth. Indeed, as disclosed herein, the timestamp synchronization system synchronizes timestamps for a multitude of media files captures on virtually any type, make, brand, or model of capture device.

Additional detail will now be provided in relation to illustrative figures portraying example embodiments and implementations of a timestamp synchronization system. For example, FIG. 1 illustrates a system 100 (or environment) in which a timestamp synchronization system 106 operates in accordance with one or more embodiments. As illustrated, the system 100 includes server device(s) 102, a network 108, a client device 110, and user devices 114 (i.e., capture devices). As further illustrated, the server device(s) 102, the client device 110, and the user devices 114 communicate with one another via the network 108.

As shown in FIG. 1, the server device(s) 102 include a visual media management system 104 that further includes the timestamp synchronization system 106. In some embodiments, the server device(s) include, but is not limited to, a computing device (such as explained below in reference to FIG. 7). In one or more embodiments, for example, the visual media management system 104 comprises a platform for uploading, organizing, and storing various types of media content, such as but not limited to digital photographs, images, videos, music, and various creative content. Whether hosted by an online or local application, the visual media management system 104 includes various tools for importing, exporting, reformatting, modifying, organizing, and sharing digital content, such as media files captured or created by various user devices.

As mentioned, the timestamp synchronization system 106 generates synchronized timestamps for media files 116 imported and capture by the user devices 114. A "media file" (sometimes referred to as "visual media") refers to a digital file comprising visual media, such as but not limited to digital images, videos, illustrations, and/or other visual media captured by user devices. For example, a "digital image" refers to a digital symbol, picture, icon, and/or other visual illustration depicting one or more objects. For instance, an image includes a digital file having a visual illustration and/or depiction of one or more persons, objects, scenes, landscapes, or the like. Indeed, in some embodiments, an image includes, but is not limited to, a digital file with the following extensions: JPEG, TIFF, BMP, PNG, RAW, DNG, or PDF. In addition, in certain instances, a media file includes a digital video, such as, but not limited to, a digital file with the following extensions: MP4, MOV, WMV, or AVI.

Relatedly, a "user device" (sometimes referred to as a "capture device") refers to any device capable of capturing or otherwise creating digital media files. For example, user devices include digital cameras, photograph scanners, video recording devices, mobile devices, tablets, laptops, personal computers, and so forth. Indeed, user devices include any form, type, model, or branding of device capable of capturing or otherwise generating media files. As mentioned above, different user devices often generate metadata (e.g., timestamp information) associated with media files of varying formatting and/or content, with some devices neglecting to include any metadata (or timestamp information) when capturing media content. Accordingly, as described below in relation to various embodiments, the timestamp synchronization system 106 implements a heuristic model to identify timestamp information across media files captured by a variety of devices to determine timestamp information and generate synchronized timestamps for each media file in a collection (e.g., in a group of related media files uploaded/imported to the visual media management system 104 and/or the visual media management application 112.

Furthermore, as shown in FIG. 1, the system 100 includes the client device 110. In some embodiments, the client device 110 includes, but is not limited to, a mobile device (e.g., smartphone, tablet), a laptop computer, a desktop computer, or any other type of computing device, including those explained below in reference to FIG. 7. Although not shown in FIG. 1, some embodiments of client device 110 are operated by a user to perform a variety of functions via a visual media management application 112 on client device 110. For example, the client device 110 (through the visual media management application 112) performs functions such as, but not limited to, importing the media files 116 from the multiple user devices 114, generating synchronized timestamps for the media files 116, and/or organizing/displaying the media files 116 according to a timeline based on the synchronized timestamps.

To access the functionalities of the timestamp synchronization system 106 (as described above and in greater detail below), in one or more embodiments, a user interacts with the visual media management application 112 (and the timestamp synchronization system) on the client device 110. For example, the visual media management application 112 includes one or more software applications (e.g., to interact with, organize, share, and/or modify digital images in accordance with one or more embodiments described herein) installed on the client device 110. In certain instances, the visual media management application 112 is hosted on the server device(s) 102. Additionally, when hosted on the server device(s) 102, the visual media management application 112 and the timestamp synchronization system 106 is accessed by the client device 110 through a web browser and/or another online interfacing platform and/or tool.

Although FIG. 1 illustrates the timestamp synchronization system 106 being implemented by a particular component and/or device within the system 100 (e.g., the server device(s) 102), in some embodiments the timestamp synchronization system 106 is implemented, in whole or part, by other computing devices and/or components in the system 100. As mentioned above, for instance, in some embodiments, the timestamp synchronization system 106 is implemented on the client device 110 within the visual media management application 112. More specifically, in one or more embodiments, the description of (and acts performed by) the timestamp synchronization system 106 are implemented (or performed by) the client device 110 via the visual media management application 112. In particular, in some embodiments, the client device 110 (via an implementation of the timestamp synchronization system 106) generates synchronized timestamps for the imported media files 116 and, in some implementations, organizes the media files 116 accordingly.

In some embodiments, the visual media management application 112 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., the media files 116, associated metadata, and/or a predetermined timestamp format). In response, the timestamp synchronization system 106 on the server device(s) 102 performs operations described herein to generate synchronized timestamps for the media files 116. The server device(s) 102 then provides the output or results of the operations (e.g., one or more synchronized timestamps) to the client device 110.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 7. Furthermore, although FIG. 1 illustrates the server device(s) 102, the client devices 110, and the user devices 114 communicating via the network 108, in certain embodiments, the various components of the system 100 communicate and/or interact via other methods (e.g., the server device(s) 102 and the client device 110 communicating directly).

As discussed above, the timestamp synchronization system 106 generates synchronized time stamps for media files captured and/or imported by multiple user devices. For instance, FIG. 2 illustrates the timestamp synchronization system 106 generating synchronized timestamps 208a-208n for respective media files 204a-204n in accordance with one or more embodiments.

Figure 2:
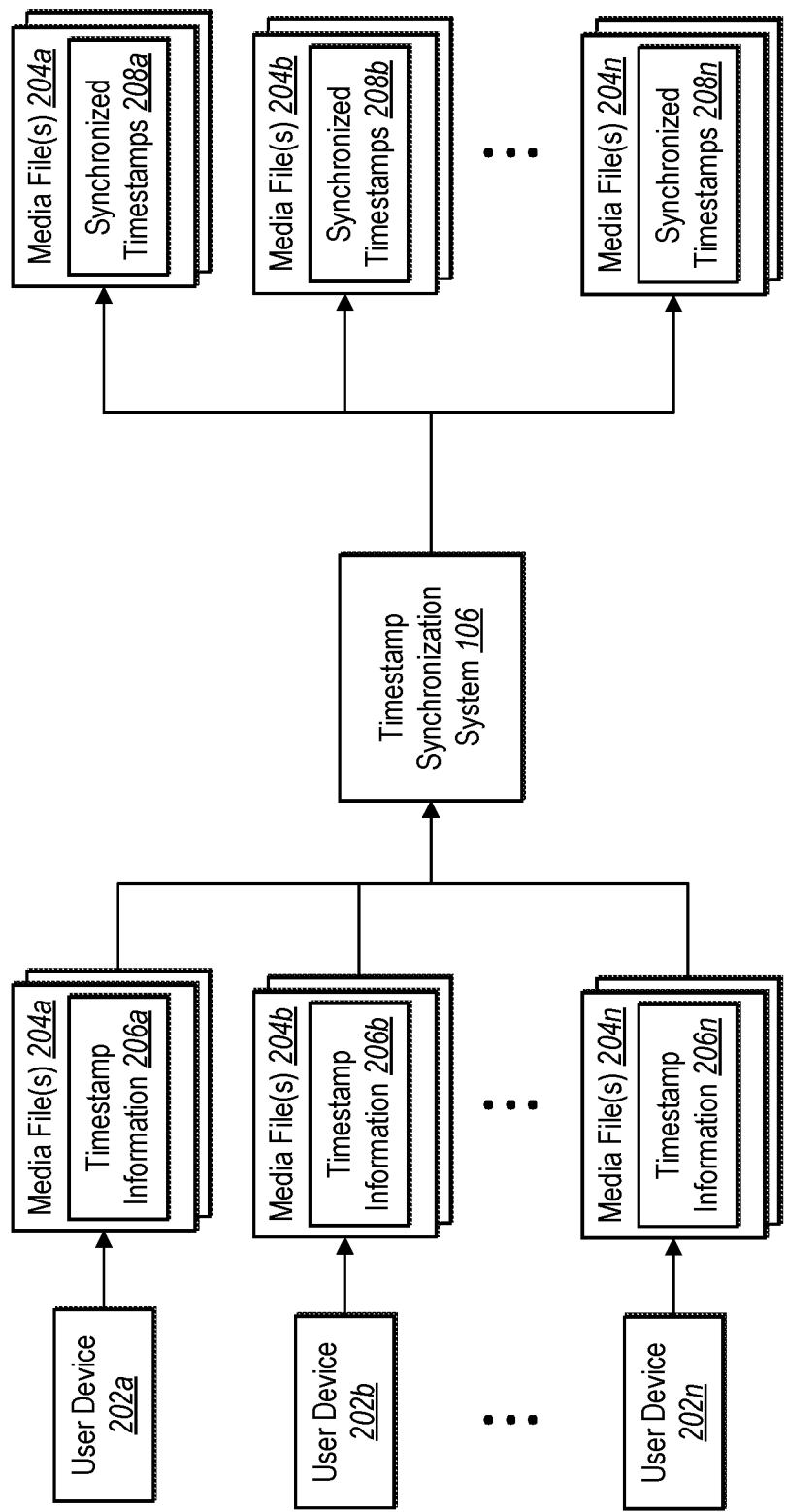
FIG. 2 illustrates an overview of a timestamp synchronization system generating synchronized timestamps for imported media files in accordance with one or more embodiments.

As shown in FIG. 2, the timestamp synchronization system 106 receives (or otherwise identifies) the multiple media files 204a-204n from the multiple user devices 202a-202n. In some implementations, for example, one or more media files are imported from each of the user devices 202a-202n via an import device connected to or otherwise capable of implementing the timestamp synchronization system 106, such as but not limited to a personal computer, a laptop computer, or a mobile device. Indeed, as shown, the timestamp synchronization system 106 receives one more media files from a variety of user devices.

As further shown in FIG. 2, the timestamp synchronization system 106 determines (or identifies) timestamp information 206a-206n for each of the respective media file(s) 204a-204n. As mentioned above, in some implementations, the timestamp information 206a-206n varies across the media files(s) 204a-204n (e.g., as stored in metadata associated with each media file by the user devices 202a-202n). In some implementations, for instance, at least one of the user devices 202a-202n incorporates timestamp information that differs from other user devices of the user devices 202a-202n. For example, user devices of different makes or models often incorporate different timestamp formats from one another and/or include different timestamp information. For instance, some user devices include a local time zone and/or capture location with each media file captured, whereas other user devices merely include a time of capture according to the system clock set by a user on the user device. Other timestamp entry fields that may differ between user devices may include, for example, a capture date, a time formatting (e.g., HH:MM:SS or HH:MM), a date formatting, GPS coordinates, and so forth.

In some implementations, the timestamp synchronization system 106 determines that the timestamp information for at least one of the media file(s) 204a-204n comprises inaccurate or incomplete timestamp information. For example, inaccurate timestamp information comprises include errors in capture time, capture time zone, or other inaccuracies/errors due to user error, corrupted metadata, device malfunctions, poor connectivity at time of capture, and so forth. Moreover, incomplete timestamp information, for example, includes missing timestamp data fields or field entries, such as time zone, capture location, date of capture, and so forth.

As also shown in FIG. 2, the timestamp synchronization system 106 generates synchronized timestamps 208a-208n for the media file(s) 204a-204n. For instance, in response to identifying inaccurate or incomplete timestamp information within the timestamp information 206a-206n of any of the media file(s) 204a-204n, the timestamp synchronization system 106 determines updated timestamp information for the media file(s) 204a-204n according to the embodiments discussed below (e.g., in relation to FIGS. 3-4). In some implementations, therefore, the synchronized timestamps 208a-208b include updated timestamp information, such as reformatted timestamp entry fields and/or updated timestamp entries that include corrected information and/or previously missing information derived from various sources according to the embodiments described herein.

In addition, in some embodiments, the timestamp synchronization system 106 utilizes the updated timestamp information within the synchronized timestamps 208a-208n to modify and/or organize the collection of media file(s) 204a-204n received from the user devices 202a-202n. In some implementations, for example, organizing the media files 204a-204n based on the respective timestamp information 206a-206n (i.e., initial timestamp information prior to synchronization by timestamp synchronization system 106)

results in an inaccurate sequential ordering due to inaccurate or incomplete timestamp information. Then, in certain implementations, an accurate sequential ordering is achieved by reordering the media files 204*a*-204*n* according to the updated timestamp information of the synchronized timestamps 208*a*-208*n*. Indeed, by generating the synchronized timestamps 208*a*-208*n* with updated, more accurate timestamp information, the timestamp synchronization system 106 provides advantages in downstream organization of media files.

As previously mentioned, the timestamp synchronization system 106 utilize one or more models and sources of information to determine updated timestamp information and generate synchronized timestamps for imported media files. For example, FIG. 3 illustrates the timestamp synchronization system 106 determining initial timestamp information for a media file 304 and utilizing external information to determine updated timestamp information for the media file 304 in order to generate a synchronized timestamp 332.

Figure 3:
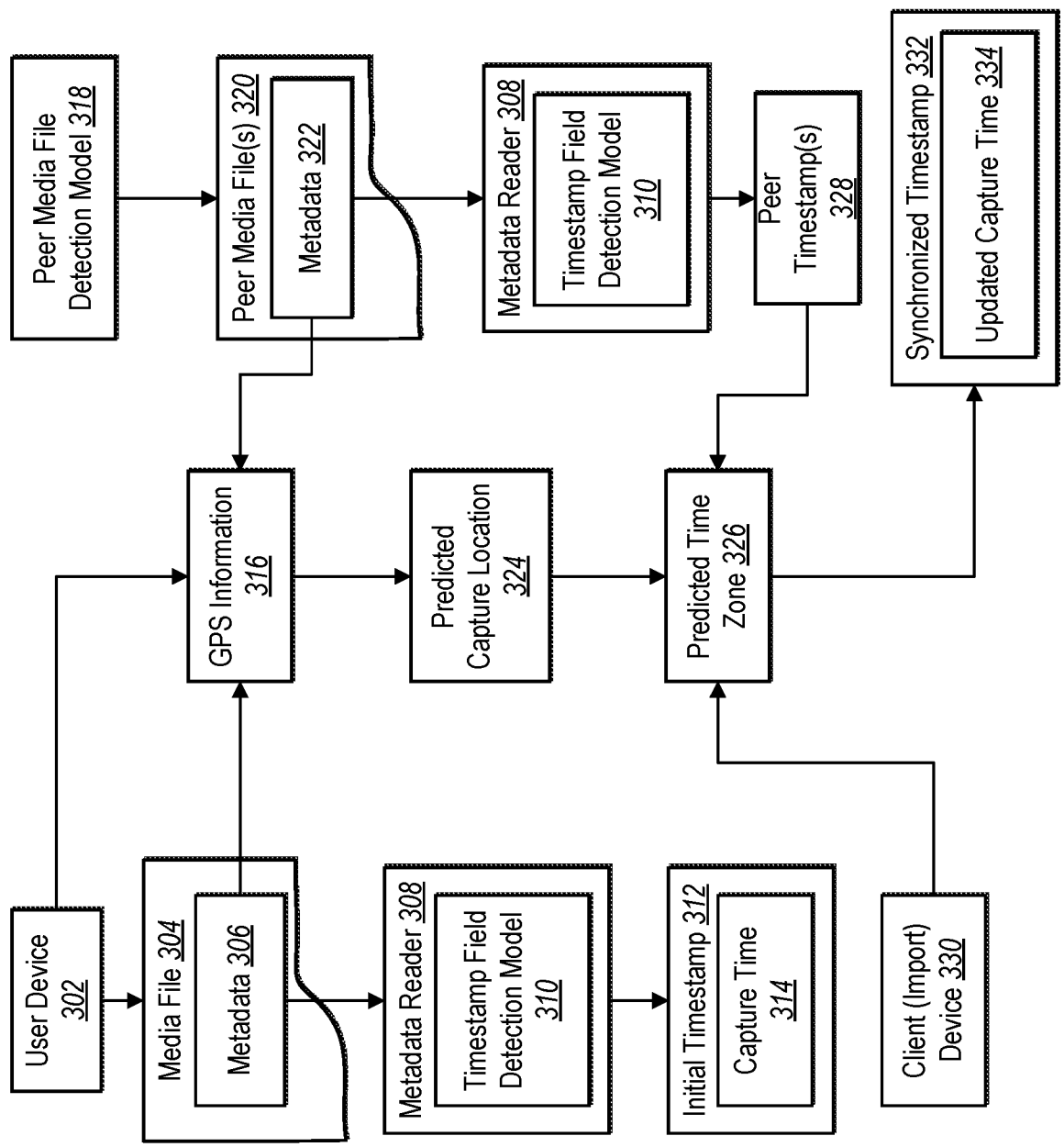
FIG. 3 illustrates a timestamp synchronization system generating a synchronized timestamp for a media file utilizing information associated with a peer media file in accordance with one or more embodiments.

As shown in FIG. 3, the timestamp synchronization system 106 receives (or otherwise identifies) the media files 304 from a user device 302. As mentioned previously, media files received by the timestamp synchronization system 106 include various contents and formats of timestamp information within metadata associated therewith (e.g., upon capture by the respective capture device, such as the user device 302). Thus, as illustrated in FIG. 3, the media file 304 includes metadata 306 comprising timestamp information for the media file 304. In different implementations (e.g., depending on the make, model, and/or settings of the user device 302) the timestamp information within the metadata 306 is incomplete, inaccurate, and/or non-compliant with a predetermined timestamp formatting. In some implementations, the metadata 306 associated with the media file 304 contains no timestamp information.

As further shown in FIG. 3, the timestamp synchronization system 106 utilizes a metadata reader 308 to access timestamp information within the metadata 306 of the media file 304. For instance, the timestamp synchronization system 106 utilizes a timestamp field detection model 310 to parse the metadata 306 into one or more timestamp entry fields, such as a capture time, a capture date, a capture time zone, a capture location, and other timestamp-related information. Indeed, utilizing the timestamp field detection model 310, the timestamp synchronization system 106 parses through various formats of metadata to identify individual entry fields of timestamp information, among other timestamp entry fields and other metadata information (e.g., file size, format, etc.).

Additionally, as shown in FIG. 3, the timestamp synchronization system 106 determines (or generates) an initial timestamp 312 with the timestamp information extracted from the metadata 306 by the metadata reader 308. In some embodiments, for example, the timestamp synchronization system 106 generates the initial timestamp 312 according to a predetermined timestamp formatting, as further described below (e.g., in relation to FIG. 4). In the illustrated implementation, the initial timestamp 312 include capture time 314.

As illustrated, in response to determining that the initial timestamp 312 comprises incomplete or inaccurate information, such as an incorrect time zone or a lack thereof, the timestamp synchronization system 106 accesses/utilizes various sources of information to determine a predicted time zone 326 of capture for the media file 304. For instance, the timestamp synchronization system 106 identifies (or attempts to access) GPS information from one or more of the user device 302, the metadata 306 associated with the media file 304, or metadata 322 of one or more peer media files 320 associated with the media file 304). The GPS information 316, for example, includes GPS coordinates of a predicted capture location 324 for the media file 304. If GPS data is not included within the metadata 306 for the media file 304, in some implementations, the timestamp synchronization system 106 accesses GPS data on the user device 302 to estimate the predicted capture location 324 for the media file 304.

As mentioned, in some implementations, the timestamp synchronization system 106 accesses GPS information 316, for determining the predicted capture location 324, from metadata 322 associated with one or more peer media files 320. The peer media file(s) 320, for example, includes media files other than the media file 304 that were captured by a user device other than the user device 302, but that are otherwise associated with (i.e., related to) the media file 304. For instance, the media file 304 and the peer media file(s) 320 include media captured by two user devices owned by a same user, include media collected on an import device in a folder or related folders, include media captured at a single location or nearby locations, and so forth.

As shown in FIG. 3, the timestamp synchronization system 106 utilizes a peer media file detection model 318 to identify the one or more peer media files 320 associated with the media file 304. In some implementations, for example, the peer media file detection model 318 determines that the media file 304 was received at a client device 330 (i.e., an import device) together with, in proximity to, or otherwise in association with importation of the peer media file(s) 320. For instance, in some implementations, a user of the client device 330 associates the media file 304 with the peer media file(s) 320 by adding both to a single collection of media files. In some embodiments, the peer media file detection model 318 utilizes an object detection model, such as a machine learning model, to identify objects portrayed within the peer media file(s) 320 that may be related to objects portrayed within the media file 304.

In certain implementations, if the timestamp synchronization system 106 successfully identifies the GPS information 316 for the media file 304 from either the metadata 306 or the user device 302, then the timestamp synchronization system 106 determines the predicted capture location 324 without further information from the peer media file(s) 320.

As further shown in FIG. 3, in some implementations, the timestamp synchronization system 106 determines a predicted time zone 326 for the media file 304 based on the predicted time capture location 324. Alternatively, in some implementations, the timestamp synchronization system 106 determines the predicted time zone 326 from one or more peer timestamps 328 corresponding to the peer media file(s) 320. As illustrated, in such implementations, the timestamp synchronization system 106 utilizes the metadata reader 308 (and the timestamp field detection model 310) to identify or generate the peer timestamp(s) 328 from the metadata 322 associated with the peer media file(s) 320. Moreover, in some implementations, the timestamp synchronization system 106 determines the predicted time zone 326 by identifying a time zone associated with the client device 330 whereby the media file 304 was uploaded.

As illustrated in FIG. 3, in response to determining the predicted time zone 326 for the media file 304, the timestamp synchronization system 106 generates the synchronized timestamp 332 for the media file 304 with an updated capture time 334 based on the predicted time zone 326. As mentioned, in one or more embodiments, the timestamp synchronization system 106 generates the synchronized timestamp 332 according to a predetermined timestamp format for consistency a across the media file 304 and other media files for which the timestamp synchronization system 106 generates synchronized timestamps (e.g., peer media file(s) 320 and other media files uploaded to the client device 330 with the media file 304).

As previously mentioned, the timestamp synchronization system 106 utilizes a heuristic model to intelligently identify timestamp information and generate synchronized timestamps for imported media files. For example, FIG. 4 illustrates the timestamp synchronization system 106 utilizing a heuristic model 400 to generate a synchronized timestamp 436 for a media file 402 according to one or more embodiments.

Figure 4:
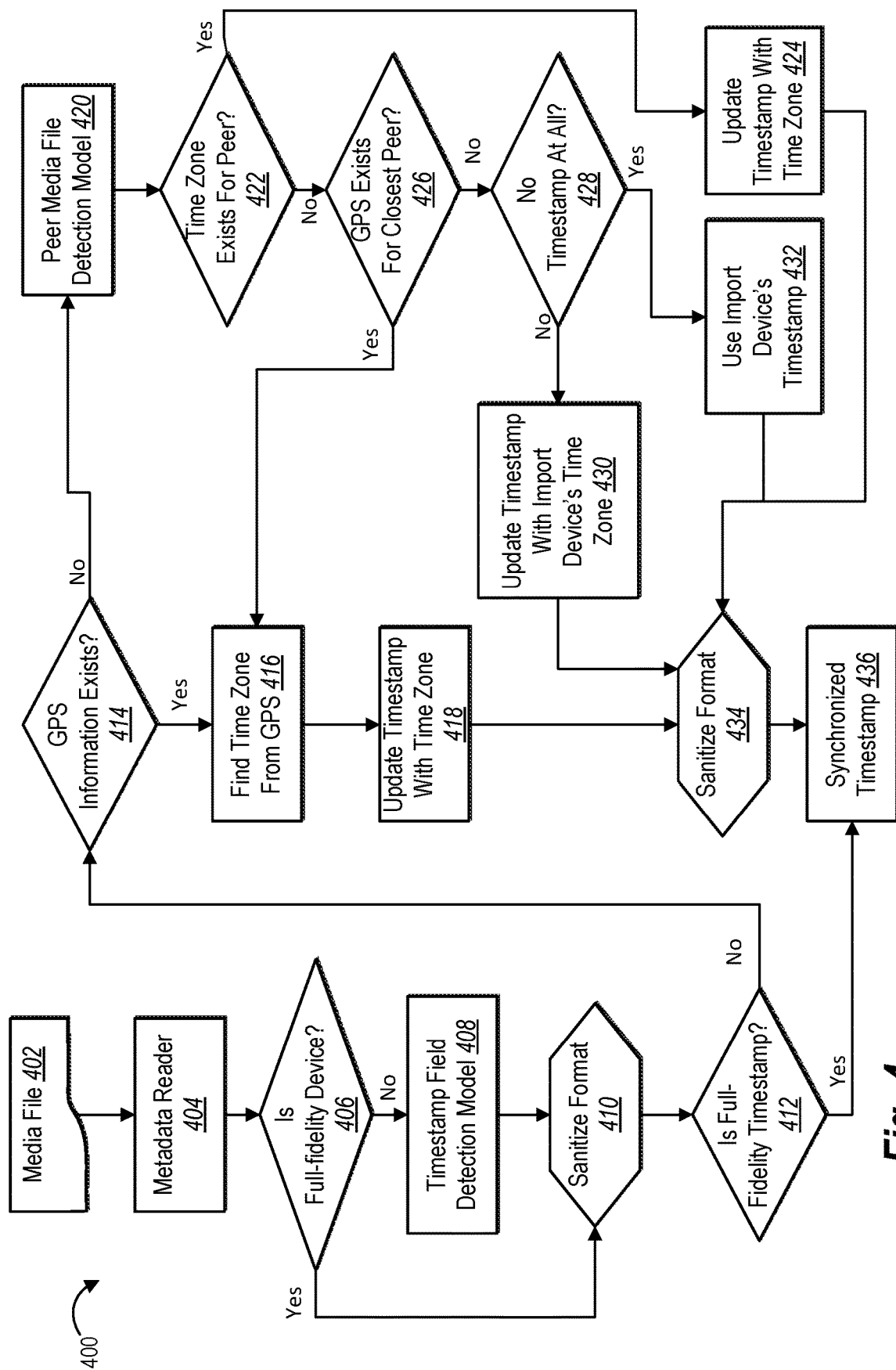
FIG. 4 illustrates a timestamp synchronization system utilizing a heuristic model to generate a synchronized timestamp in accordance with one or more embodiments.

As shown in FIG. 4, the timestamp synchronization system 106 utilizes a metadata reader 404 (e.g., as also described above in relation to FIG. 3) to determine initial timestamp information from metadata associated with the media file 402. As illustrated, the timestamp synchronization system 106 utilizes the metadata reader 404 to determine, at 406, whether a device that captured the media file 402 is known to provide all of the timestamp field entries of a full-fidelity timestamp. A "full-fidelity timestamp" refers to a timestamp with complete timestamp information (e.g., according to a predetermined timestamp template). In one or more embodiments, for example, a full-fidelity timestamp includes a timestamp having timestamp field entries for the capture time and time zone of capture. Additional field entries may be required in certain implementations, such as capture location or coordinates. In some embodiments, classification as a full-fidelity timestamp requires that the capture time be recorded with a particular level of accuracy, such as seconds within a minute (e.g., HH:MM:SS). Moreover, in one or more embodiments, a full-fidelity timestamp includes a predetermined timestamp formatting, such as the following exemplary timestamps: 2022-09-19T20:13:41Z or 2022-09-19T20:13:41-7:00, wherein the final entry represents a capture time zone.

As further illustrated in FIG. 4, in response to determining at 406 that the capture device is a full-fidelity device (i.e., the metadata associated with media file 402 includes complete timestamp information), the timestamp synchronization system 106 sanitizes the timestamp format at 410 to generate an initial timestamp for the media file 402. In some implementations, for instance, the timestamp synchronization system 106 determines at 406 that the timestamp information is complete but also determines that a formatting of the timestamp information does not follow a predetermined timestamp formatting. Accordingly, the timestamp synchronization system 106 generates an initial timestamp at 410 according to the predetermined timestamp formatting and the timestamp information identified by the metadata reader 404. Then, in response to determining, at 412, that the initial timestamp is a full-fidelity timestamp (i.e., includes complete timestamp information according to the predetermined timestamp formatting), the timestamp synchronization system 106 stores (or otherwise provides) the initial timestamp as a synchronized timestamp 436.

Alternatively, in some implementations, the timestamp synchronization system 106 determines, at 406, that the metadata associated with the media file 402 includes incomplete timestamp information (e.g., the capture device is not identified as a full-fidelity device). In response, the timestamp synchronization system 106 utilizes a timestamp field detection model 408 to determine initial timestamp information for the media file 402 and, at 410, generates an initial timestamp according to the aforementioned predetermined timestamp formatting. Then, in response to determining, at 412, that the initial timestamp is incomplete or inaccurate (i.e., not a full-fidelity timestamp), the timestamp synchronization system 106 continues to implement the heuristic model 400 to determine updated timestamp information for the media file 402.

In response to determining, at 412, that the initial timestamp comprises an inaccurate time zone or does not include a time zone entry, the timestamp synchronization system 106 determines, at 414, whether GPS information is available for the media file 402. In some implementations, for example, the timestamp synchronization system 106 identifies GPS information within the metadata associated with the media file 402 or otherwise extracts GPS information from the user device that captured the media file 402. In response to determining the GPS information, the timestamp synchronization system 106 determines, at 416, a predicted time zone for the media file 402 and generates, at 418, updated timestamp information with the newly determined time zone. Then, in response to updating the timestamp information at 418, the timestamp synchronization system 106 sanitizes the timestamp format at 434 to generate the synchronized timestamp 436.

Alternatively, in implementations wherein the timestamp synchronization system 106 determines, at 414, that GPS information is not available for the media file 402 (i.e., from the metadata thereof or the corresponding capture device), the timestamp synchronization system 106 utilizes additional sources of information to determine a predicted time zone for the media file 402. As illustrated, for instance, the timestamp synchronization system 106 utilizes a peer media file detection model 420 to identify one or more peer media files associated with the media file 402 (e.g., as described above in relation to FIG. 3). In some embodiments, for example, the peer media file detection model 420 identifies peer media files associated with a same user, a same location, or other relating factors between media files, users, and/or user devices. Alternatively, in some implementations, a user directly provides peer media files to the timestamp synchronization system 106, such as files captured by a different user device than that of the media file 402.

In response to identifying (or receiving) one or more peer media files, the timestamp synchronization system 106 determines, at 422, whether time zone information is included within metadata associated with the one or more peer media files. Then, in response to identifying a time zone for the peer media file(s) at 422, the timestamp synchronization system 106 updates the initial timestamp information of the media file 402 with the time zone from the peer media file(s) at 424 and sanitizes the timestamp format according to the predetermined timestamp formatting at 434 to generate the synchronized timestamp 436.

Alternatively, in response to determining, at 422, that time zone information associated with the peer media file(s) is not available, the timestamp synchronization system 106 determines, at 426, whether GPS information exists for the peer media file(s) or the use device that captured the peer media file(s). Then, in response to identifying GPS information for the peer media file(s) at 426, the timestamp synchronization system 106 determines, at 416, a predicted time zone from the identified GPS information and updates the initial timestamp information with the predicted time zone at 418.

Alternatively, in response to determining, at 426, that GPS information is not available for the peer media file(s), the timestamp synchronization system 106 accesses and utilizes time zone information from an import device to which the media file 402 was uploaded. For instance, in implementations wherein, at 428, the timestamp synchronization system 106 determines that timestamp information for the media file 402 is not available (i.e., no timestamp field entries found by the timestamp field detection model 408), the timestamp synchronization system 106 uses, at 432, timestamp information from the import device to generate, at 434, the synchronized timestamp 436 for the media file 402. In implementations wherein an incomplete initial timestamp (i.e., no time zone) is available for the media file 402, the timestamp synchronization system 106 updates, at 430, the initial timestamp with the time zone of the import device to generate, at 434, the synchronized timestamp 436 for the media file 402. Indeed, the timestamp synchronization system 106 utilizes any combination of the foregoing methods and models to determine updated timestamp information for the synchronized timestamp 436.

Figure 5:
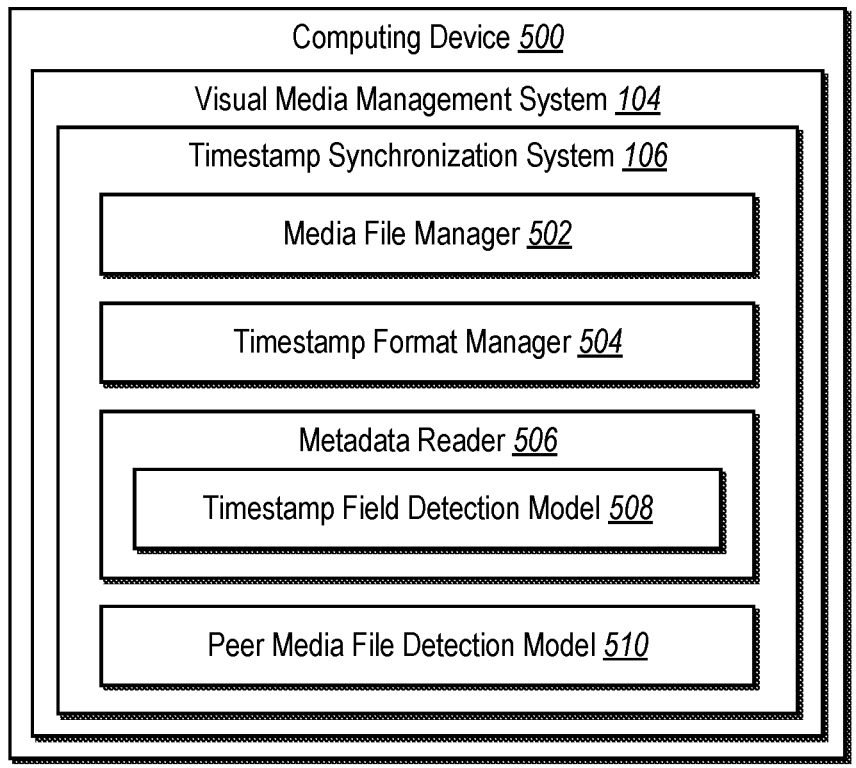
FIG. 5 illustrates a schematic diagram of a timestamp synchronization system in accordance with one or more embodiments.

Turning now to FIG. 5, additional detail will be provided regarding components and capabilities of one or more embodiments of the timestamp synchronization system 106. In particular, FIG. 5 illustrates an example timestamp synchronization system 106 executed by a computing device 500 (e.g., the server devices(s) 102 or the client device 110). As shown by the embodiment of FIG. 5, the computing device 500 includes or hosts the visual media management system 104 and/or the timestamp synchronization system 106. Furthermore, as shown in FIG. 5, the timestamp synchronization system 106 includes a media file manager 502, a timestamp format manager 504, a metadata reader 506, and a peer media file detection model 510.

As just mentioned, and as illustrated in the embodiment of FIG. 5, the timestamp synchronization system 106 includes the media file manager 502. For instance, the media file manager 502 identifies, stores, transmits, and/or displays digital media files as described above (e.g., in relation to FIGS. 1-4). Furthermore, as shown in FIG. 5, the timestamp synchronization system 106 includes the timestamp format manager 504. For instance, the timestamp format manager 504 manages the predetermine timestamp formats described herein (e.g., in relation to FIGS. 2-4).

As also shown in FIG. 5, the timestamp synchronization system 106 includes the metadata reader 506 for identifying, reading, and/or extracting metadata, including initial timestamp information, associated with imported media files, as described above (e.g., in relation to FIGS. 2-4). In some embodiments, the metadata reader 506 includes a timestamp field detection model 508 for parsing metadata generated by capture devices to determine initial timestamp data for imported media files, as described above (e.g., in relation to FIGS. 3-4). Additionally, as shown in FIG. 5, the timestamp synchronization system 106 includes the peer media file detection model 510 for identifying media files associated with an imported media file for extraction of related timestamp information, as described above (e.g., in relation to FIGS. 2-4).

Each of the components 502-510 of the timestamp synchronization system 106 can include software, hardware, or both. For example, the components 502-510 can include one or more instructions stored on a computer-readable storage medium and executable by processors of one or more computing devices, such as a client device or server device. When executed by the one or more processors, the computer-executable instructions of the timestamp synchronization system 106 can cause the computing device(s) to perform the methods described herein. Alternatively, the components 502-510 can include hardware, such as a special-purpose processing device to perform a certain function or group of functions. Alternatively, the components 502-510 of the timestamp synchronization system 106 can include a combination of computer-executable instructions and hardware.

Furthermore, the components 502-510 of the timestamp synchronization system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-510 may be implemented as a stand-alone application, such as a desktop or mobile application. Furthermore, the components 502-510 may be implemented as one or more web-based applications hosted on a remote server. The components 502-510 may also be implemented in a suite of mobile device applications or "apps." To illustrate, the components 502-510 may be implemented in an application, including but not limited to ADOBE® PHOTOSHOP, ADOBE® LIGHTROOM, ADOBE® CREATIVE CLOUD, ADOBE® PREMIERE, and other ADOBE® products. "ADOBE", "ADOBE PHOTOSHOP", "ADOBE LIGHTROOM", "ADOBE CREATIVE CLOUD", and "ADOBE PREMIER" are either registered trademarks or trademarks of Adobe Systems Incorporated in the United States and/or other countries.

Figure 6:
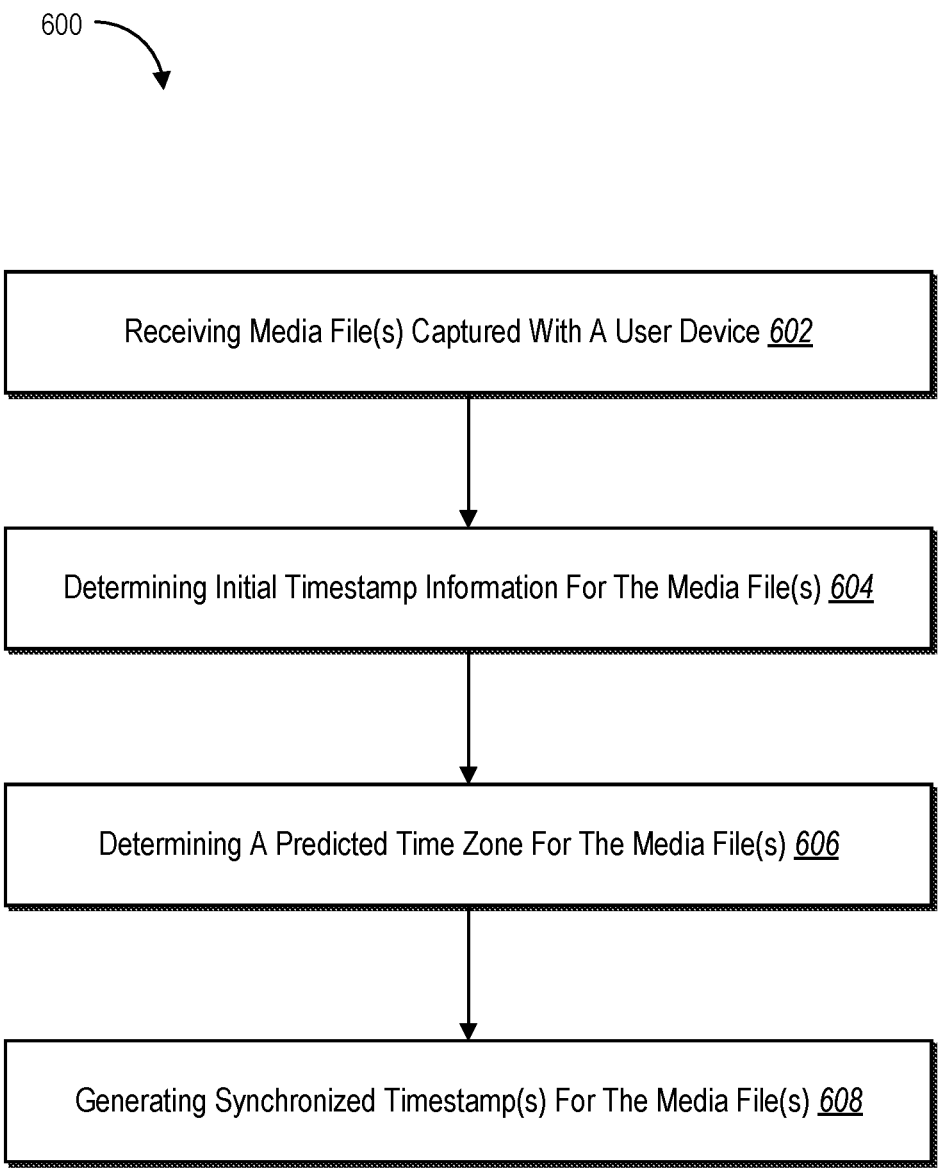
FIG. 6 illustrates a flowchart of a series of acts for generating synchronized time stamps in accordance with one or more embodiments.

FIGS. 1-5, the corresponding text, and the examples provide a number of different methods, systems, devices, and non-transitory computer-readable media of the timestamp synchronization system 106. In addition to the foregoing, one or more embodiments can also be described in terms of flowcharts comprising acts for accomplishing a particular result, as shown in FIG. 6. FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a series of acts 600 for generating synchronized timestamps for media files in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown in FIG. 6, the series of acts 600 includes an act 602 for receiving media file(s) captured with a user device, an act 604 for determining initial timestamp information for the media file(s), an act 606 for determining a predicted time zone for the media file(s), and an act 608 for generating synchronized timestamp(s) for the media file(s).

In particular, in some embodiments, the act 602 can include receiving a media file captured with a user device, the act 604 can include determining that the initial timestamp for the media file includes inaccurate or incomplete time zone information, the act 606 can include determining a predicted time zone for the media file by extracting GPS information from the metadata associated with the media file or identifying a peer media file and utilizing a time zone or GPS information associated with the peer media file, and the act 608 can include generating a synchronized timestamp for the media file with updated timestamp information based on the predicted time zone.

For example, in one or more embodiments, determining the initial timestamp information for the media file comprises parsing, utilizing a timestamp field detection model, the metadata associated with the media file to determine a plurality of timestamp field entries for the media file, the plurality of timestamp field entries including a capture time for the media file. In some embodiments, the series of acts 600 further includes generating an initial timestamp for the media file by modifying the plurality of timestamp field entries according to a predetermined timestamp format. Also, in some embodiments, generating the synchronized timestamp for the media file comprises modifying the capture time in the initial timestamp based on the predicted time zone.

In addition, in one or more embodiments, determining the predicted time zone for the media file comprises accessing the GPS information from the metadata associated with the media file or the GPS information associated with the peer media file to determine a predicted capture location for the media file. Also, in some embodiments, identifying the peer media file comprises utilizing a peer media file detection model to determine that the peer media file was captured on an additional user device associated with the user device.

Further, in some embodiments, the series of acts 600 includes receiving the media file and the peer media file at an import device and generating the synchronized timestamp for the media file and an additional synchronized timestamp for the peer media file, the synchronized timestamp and the additional synchronized timestamp comprising respective timestamp information in a predetermined timestamp format. Also, in one or more embodiments, the series of acts 600 includes receiving the media file at an import device other than the user device, identifying a system time zone of the import device, and designating the system time zone as the predicted time zone.

Also, in one or more embodiments, generating the synchronized timestamp for the media file comprises generating the updated timestamp information by modifying a capture time indicated by the initial timestamp information based on the predicted time zone. In some embodiments, generating the synchronized timestamp for the media file further comprises modifying an initial format of the initial timestamp information according to a predetermined timestamp format.

In addition, in some embodiments, the series of acts 600 includes receiving the media file and an additional media file at an import device, determining that timestamp information for the additional media file is unavailable, and, in response, generating an additional synchronized timestamp for the additional media file, the additional synchronized timestamp comprising the updated timestamp information of the media file or timestamp information associated with the peer media file.

Further, in some embodiments, the series of acts 600 includes receiving an additional media file captured with an additional user device, determining that timestamp information for the additional media file comprises an initial format different than a predetermined timestamp format, and generating an additional synchronized timestamp for the media file by changing the initial format to comply with the predetermined timestamp format.

Moreover, in some embodiments, the act 602 can include receiving a collection of media files captured with a plurality of user devices, the act 604 can include determining that the initial timestamp information includes inaccurate or incomplete time zone information for one or more first media files of the collection of media files, the act 606 can include determining a predicted time zone for the one or more first media files based on information associated with one or more second media files of the collection of media files, and the act 608 can include generating synchronized timestamps for the collection of media files, the synchronized timestamps for the one or more first media files comprising updated timestamp information based on the predicted time zone.

Also, in one or more embodiments, the series of acts 600 includes determining that the one or more first media files were captured by a first user device of the plurality of user devices, determining that the one or more second media files were captured by a second user device of the plurality of user devices, and, in response, extracting the information associated with the one or more second media files to determine the predicted time zone.

Further, in some embodiments, determining the predicted time zone for the one or more first media files comprises determining that the information associated with the one or more second media files includes time zone information and extracting the predicted time zone from the information associated with the one or more second media files. Moreover, in one or more embodiments, determining the predicted time zone for the one or more first media files comprises extracting GPS information from the information associated with the one or more second media files to determine a predicted capture location for the one or more second media files and determining the predicted time zone for the one or more first media files based on the predicted capture location for the one or more second media files.

In addition, in one or more embodiments, the series of acts 600 includes parsing, utilizing a timestamp field detection model, the metadata associated with the collection of media files to determine a plurality of timestamp field entries for each media file within the collection of media files, each plurality of timestamp field entries including a capture time for each respective media file. Also, in some embodiments, generating the synchronized timestamps for the one or more first media files comprises generating the updated timestamp information by updating the capture time for each media file of the one or more first media files based on the predicted time zone. Further, in some embodiments, the series of acts 600 includes displaying, within a user interface on an import device, the collection of media files in a sequential order based on the synchronized timestamps for the collection of media files.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
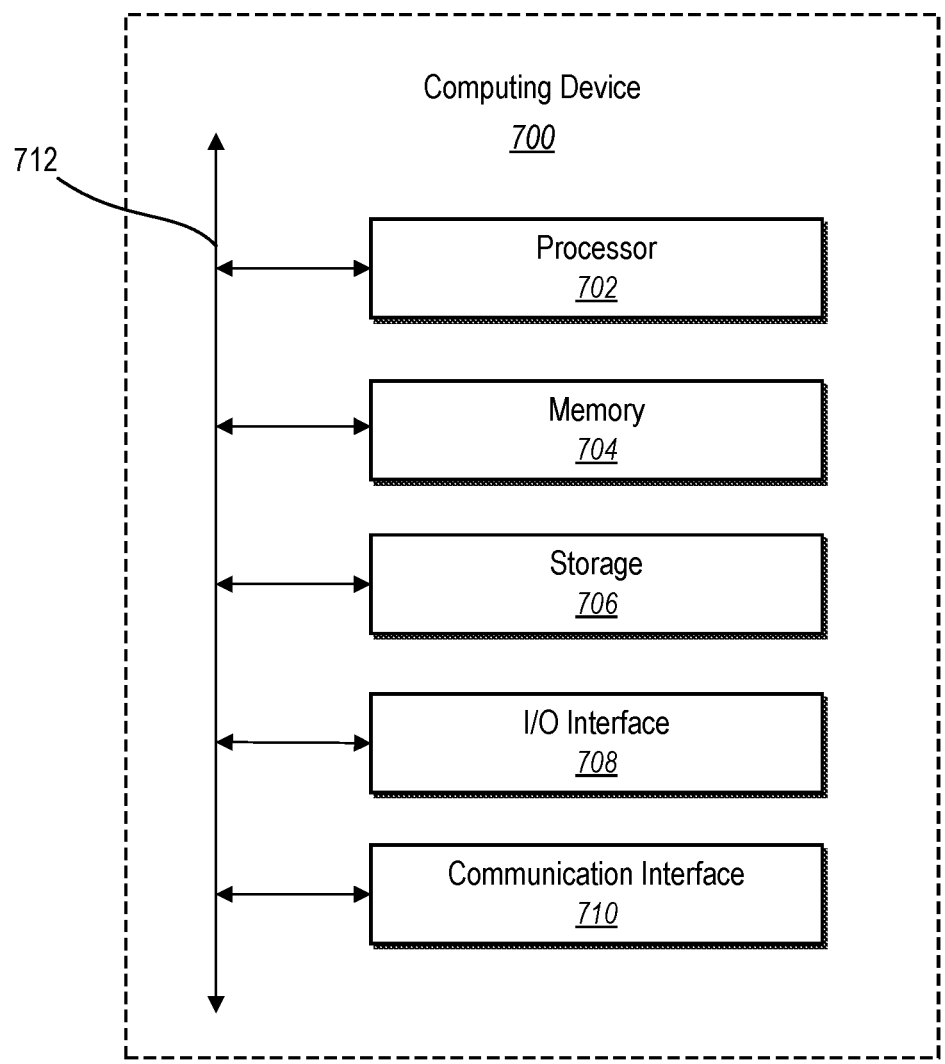
FIG. 7 illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700 may represent the computing devices described above (e.g., computing device 500, server device(s) 102, user devices 114, and client device 110). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 can include a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 can include hardware, software, or both that connects components of computing device 700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, by a computer system, a media file captured with a user device; and
   in response to the receiving the captured media file:
   determining, by the computer system from metadata associated with the captured media file, initial timestamp information for the captured media file by parsing, utilizing a timestamp field detection model run on a computing device, the metadata to determine one or more timestamp field entries for the captured media file;
   determining, by the computer system in response to determining that the initial timestamp information determined for the captured media file includes inaccurate or incomplete time zone information, a predicted time zone for the captured media file by:
   identifying, by the computer system in response to determining that Global Positioning System (GPS) information for the captured media file is not available within the metadata associated with the captured media file, a peer media file; and
   utilizing a time zone or GPS information of the peer media file to determine the predicted time zone for the captured media file; and
   generating, by the computer system, a synchronized timestamp for the captured media file with updated timestamp information based on the predicted time zone by modifying the one or more timestamp field entries for the captured media file according to a predetermined timestamp format.

2. The computer-implemented method of claim 1, wherein determining the initial timestamp information for the captured media file comprises:
   parsing, utilizing a timestamp field detection model, the metadata associated with the captured media file to determine a plurality of timestamp field entries for the captured media file, the plurality of timestamp field entries including a capture time for the captured media file.

3. The computer-implemented method of claim 2, further comprising:
   generating an initial timestamp for the captured media file by modifying the plurality of timestamp field entries according to the predetermined timestamp format.

4. The computer-implemented method of claim 3, wherein generating the synchronized timestamp for the captured media file comprises modifying the capture time in the initial timestamp based on the predicted time zone.

5. The computer-implemented method of claim 1, wherein determining the predicted time zone for the captured media file comprises accessing the GPS information from the metadata associated with the captured media file or the GPS information associated with the peer media file to determine a predicted capture location for the captured media file.

6. The computer-implemented method of claim 1, wherein identifying the peer media file comprises utilizing a peer media file detection model to determine that the peer media file was captured on an additional user device associated with the user device.

7. The computer-implemented method of claim 6, further comprising:
receiving the captured media file and the peer media file at an import device; and
generating the synchronized timestamp for the captured media file and an additional synchronized timestamp for the peer media file, the synchronized timestamp and the additional synchronized timestamp comprising respective timestamp information in the predetermined timestamp format.

8. The computer-implemented method of claim 1, further comprising:
receiving the captured media file at an import device other than the user device;
identifying a system time zone of the import device; and
designating the system time zone as the predicted time zone.

9. A non-transitory computer-readable medium storing executable instructions, which when executed by at least one processor, cause the at least one processor to perform operations comprising:
receiving a media file captured with a user device; and
in response to receiving the captured media file:
determining, from metadata associated with the captured media file, initial timestamp information for the captured media file by parsing, utilizing a timestamp field detection model, the metadata to determine one or more timestamp field entries for the captured media file;
determining, in response to determining that the initial timestamp information for the captured media file includes inaccurate or incomplete time zone information, a predicted time zone for the captured media file by:
identifying, in response to determining that Global Positioning System (GPS) information for the captured media file is not available within the metadata associated with the captured media file, a peer media file; and
utilizing a time zone or GPS information of the peer media file to determine the predicted time zone for the captured media file; and
generating a synchronized timestamp for the captured media file with updated timestamp information based on the predicted time zone by modifying the one or more timestamp field entries for the captured media file according to a predetermined timestamp format.

10. The non-transitory computer-readable medium of claim 9, wherein generating the synchronized timestamp for the captured media file comprises generating the updated timestamp information by modifying a capture time indicated by the initial timestamp information based on the predicted time zone.

11. The non-transitory computer-readable medium of claim 9, wherein generating the synchronized timestamp for the captured media file further comprises modifying an initial format of the initial timestamp information according to the predetermined timestamp format.

12. The non-transitory computer-readable medium of claim 9, further comprising:
receiving the captured media file and an additional media file at an import device;
determining that timestamp information for the additional media file is unavailable; and
in response, generating an additional synchronized timestamp for the additional media file, the additional synchronized timestamp comprising the updated timestamp information of the captured media file or timestamp information associated with the peer media file.

13. The non-transitory computer-readable medium of claim 9, further comprising:
receiving an additional media file captured with an additional user device;
determining that timestamp information for the additional media file comprises an initial format different than the predetermined timestamp format; and
generating an additional synchronized timestamp for the captured media file by changing the initial format to comply with the predetermined timestamp format.

14. A system comprising:
one or more memory devices; and
one or more processors coupled to the one or more memory devices that cause the system to perform operations comprising:
receiving a media file captured with a user device; and
in response to the receiving the captured media file:
determining, from metadata associated with the captured media file, initial timestamp information for the captured media file by parsing, utilizing a timestamp field detection model run on a computing device, the metadata to determine one or more timestamp field entries for the captured media file;
determining, in response to determining that the initial timestamp information determined for the captured media file includes inaccurate or incomplete time zone information, a predicted time zone for the captured media file by:
identifying, in response to determining that Global Positioning System (GPS) information for the captured media file is not available within the metadata associated with the captured media file, a peer media file; and
utilizing a time zone or GPS information of the peer media file to determine the predicted time zone for the captured media file; and
generating a synchronized timestamp for the captured media file with updated timestamp information based on the predicted time zone by modifying the one or more timestamp field entries for the captured media file according to a predetermined timestamp format.

15. The system of claim 14, wherein determining the initial timestamp information for the captured media file comprises:
parsing, utilizing a timestamp field detection model, the metadata associated with the captured media file to determine a plurality of timestamp field entries for the captured media file, the plurality of timestamp field entries including a capture time for the captured media file.

16. The system of claim 15, wherein the operations further comprise:

generating an initial timestamp for the captured media file by modifying the plurality of timestamp field entries according to the predetermined timestamp format.

17. The system of claim 16, wherein generating the synchronized timestamp for the captured media file comprises modifying the capture time in the initial timestamp based on the predicted time zone.

18. The system of claim 14, wherein determining the predicted time zone for the captured media file comprises accessing the GPS information from the metadata associated with the captured media file or the GPS information associated with the peer media file to determine a predicted capture location for the captured media file.

19. The system of claim 14, wherein identifying the peer media file comprises utilizing a peer media file detection model to determine that the peer media file was captured on an additional user device associated with the user device.

20. The system of claim 14, wherein the operations further comprise:
- receiving an additional media file captured with an additional user device;
- determining that timestamp information for the additional media file comprises an initial format different than the predetermined timestamp format; and
- generating an additional synchronized timestamp for the captured media file by changing the initial format to comply with the predetermined timestamp format.

* * * * *